2 Sheets—Sheet 1.

R. HAMILTON.
Harrow and Seed Sower.

No. 230,271. Patented July 20, 1880.

Witnesses:
P. L. Ourand
H. Aubrey Toulmin

Inventor:
Robert Hamilton
Alexander Mason

N. PETERS, PHOTO-LITHOGRAPHER, WASHINGTON, D. C.

2 Sheets—Sheet 2.
R. HAMILTON.
Harrow and Seed Sower.
No. 230,271. Patented July 20, 1880.
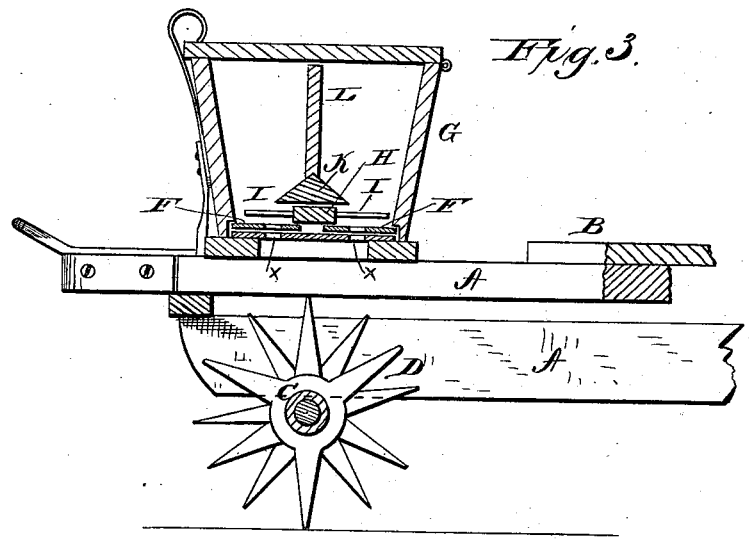
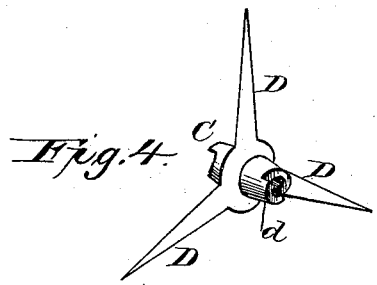
Witnesses:
Inventor:

UNITED STATES PATENT OFFICE.

ROBERT HAMILTON, OF FRANKLIN, INDIANA.

HARROW AND SEED-SOWER.

SPECIFICATION forming part of Letters Patent No. 230,271, dated July 20, 1880.

Application filed February 25, 1880.

*To all whom it may concern:*

Be it known that I, ROBERT HAMILTON, of Franklin, in the State of Indiana, have invented certain new and useful Improvements in Harrow and Seed-Sower Combined; and I do hereby declare that the following is a full, clear, and exact description thereof, reference being had to the accompanying drawings, and to the letters of reference marked thereon, making a part of this specification.

The nature of my invention consists in the construction and arrangement of a combined harrow and seed and fertilizer sower, as will be hereinafter more fully set forth.

In order to enable others skilled in the art to which my invention appertains to make and use the same, I will now proceed to describe its construction and operation, referring to the annexed drawings, in which—

Figure 1:
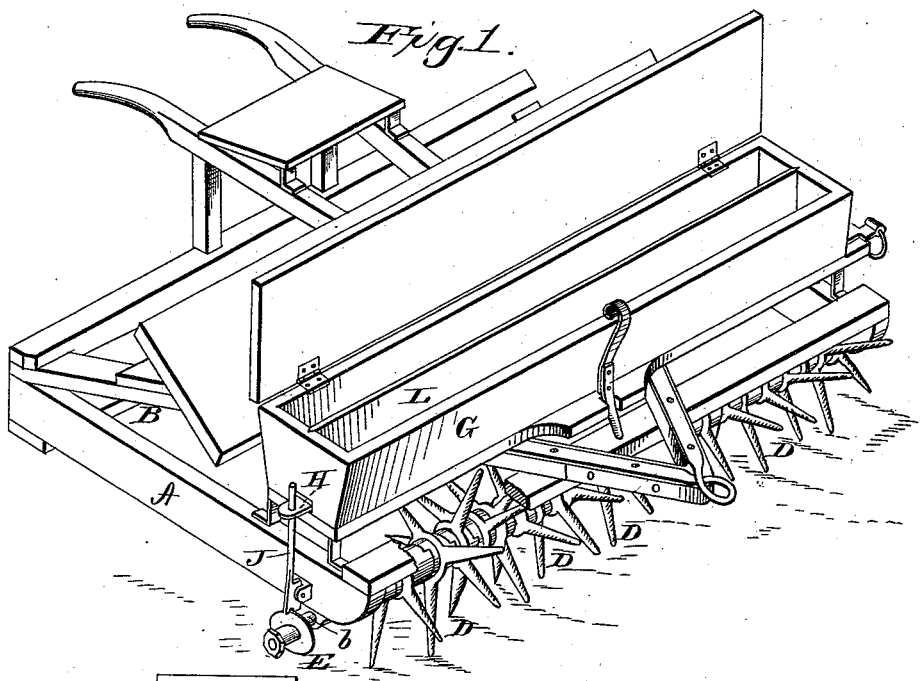
Figure 2:
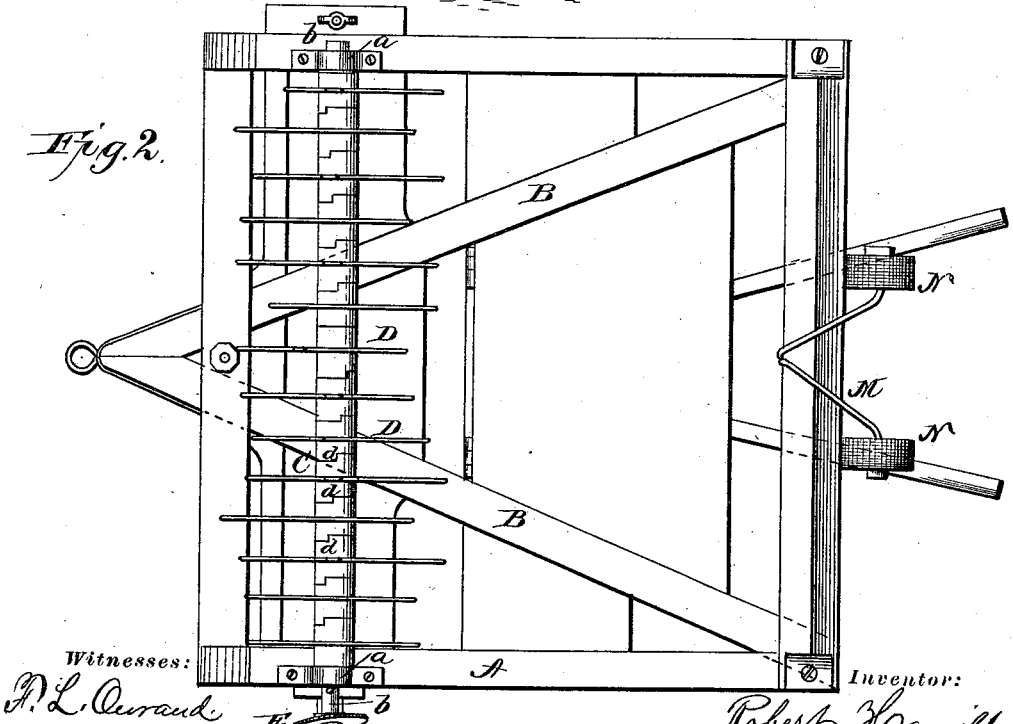

Figure 1 is a perspective view of my combined harrow and seeder. Fig. 2 is a bottom view of the same. Fig. 3 is a central cross-section thereof, and Fig. 4 is a perspective view of one of the wheels composing the harrow.

A represents the frame of the harrow, made in rectangular or other suitable shape, and provided with two diagonal or inclined braces, B B, which run from the rear corners to a center point in front of the frame, and to these connected ends of the braces the team is to be connected.

In boxes $a$ $a$, on the under sides of the side pieces of the frame, is placed a shaft, $b$, which is rotated therein by the action of the toothed or star wheels placed thereon. Each of these wheels is composed of a hub, C, with three points, D, at equal distances apart, and each end of the hub cut away, as shown at $d$, so that when placed side by side the hubs will fit into each other and lock together. The teeth or points D of the roller, composed of a series of these wheels, are set on a spiral, and the locks are also arranged on a spiral. I make two sets or series of the wheels, so as to form, in fact, two separate rollers, and the spirals run from the center toward the ends.

The different wheels are loose on the shaft or axle $b$, but by the spiral arrangement of the teeth and the locks a binding twist is given while in operation, creating a sufficient amount of friction to prevent the wheels turning on the axle and to cause the axle to have a continuous rotary motion.

On one end of the shaft or axle $b$ is attached a disk, E, set in an inclined position, as shown particularly in Fig. 2.

On top of the forward portion of the frame is placed a seed-box, G, having two rows or series of openings, $x$ $x$, in its bottom. Immediately above the seed-box bottom are two longitudinal slides, F F, provided with corresponding openings, so as to regulate the amount of seed or fertilizer sown through each set or series of openings $x$.

Above the slides F F is a longitudinally-reciprocating agitator, consisting of a straight bar, H, with a series of teeth, I, extending on each side thereof over the two slides. This agitator projects at one end through the seed-box, and through this projecting end is passed the upper end of a lever, J, which is suitably pivoted to the side of the main frame, so as to rock slightly. The lower end of the lever J is forked, and straddles the inclined disk E.

By the revolution of the shaft $b$ and disk E the lever J obtains a rocking motion on its pivot, which gives a reciprocating motion to the agitator, thereby preventing any clogging.

Above the agitator is a triangular division-piece, K, running lengthwise in the seed-box and fastened to the ends of the box.

L is a central longitudinal partition, fitting in grooves in the end pieces of the box and coming down on the top angle of the division-piece K.

By this arrangement the seed-box is divided longitudinally in two parts, so as to sow seed and distribute fertilizer at the same time; or I may distribute salt and lime or any other two articles in varying proportions at the same time. By removing the partition L the box becomes all in one, and seed or other articles may be distributed as desired.

The rear part of the frame is supported on a truck, M, with two wheels, N N, the truck being arranged, like an ordinary caster-frame, to turn more or less to either side.

I am aware that harrows have been made that consist of a series of wheels or hubs with projecting teeth and arranged to interlock with each other in such a manner as to bring the teeth in spiral form; but in such cases the rollers formed by the wheels or hubs will turn on the axle, or, if the axle is to be rotated, the wheels must be fastened thereon. By my invention of arranging the locks in spiral form from the center in opposite directions toward both ends there is no necessity of any extraneous fastenings, as the spirally-arranged locks cause a twist and bind on the shaft, which will perforce rotate the same, and the wheels cannot turn thereon under any circumstances.

Having thus fully described my invention, what I claim as new, and desire to secure by Letters Patent, is—

1. In a harrow, the combination of the two series of star-wheels C, provided with interlocking hubs D, and arranged upon the shaft $b$ to form two separate rollers, the teeth and locks running spirally from the center toward both ends, substantially as and for the purposes herein set forth.

2. In a harrow, the combination of the two series of star-wheels C, provided with interlocking hubs D, and arranged upon the shaft $b$ to form two separate rollers, the teeth and locks running spirally from the center toward both ends, with the seed-box G, agitator H I, lever J, and inclined disk E, substantially as and for the purposes herein set forth.

In testimony that I claim the foregoing I have hereunto set my hand this 24th day of February, 1880.

ROBERT HAMILTON.

Witnesses:
H. AUBREY TOULMIN,
J. J. MCCARTHY.